No. 698,253. Patented Apr. 22, 1902.
P. BOUËRY.
MACHINE FOR MOVING BOULDERS, &c.
(Application filed Feb. 4, 1901.)
(No Model.)
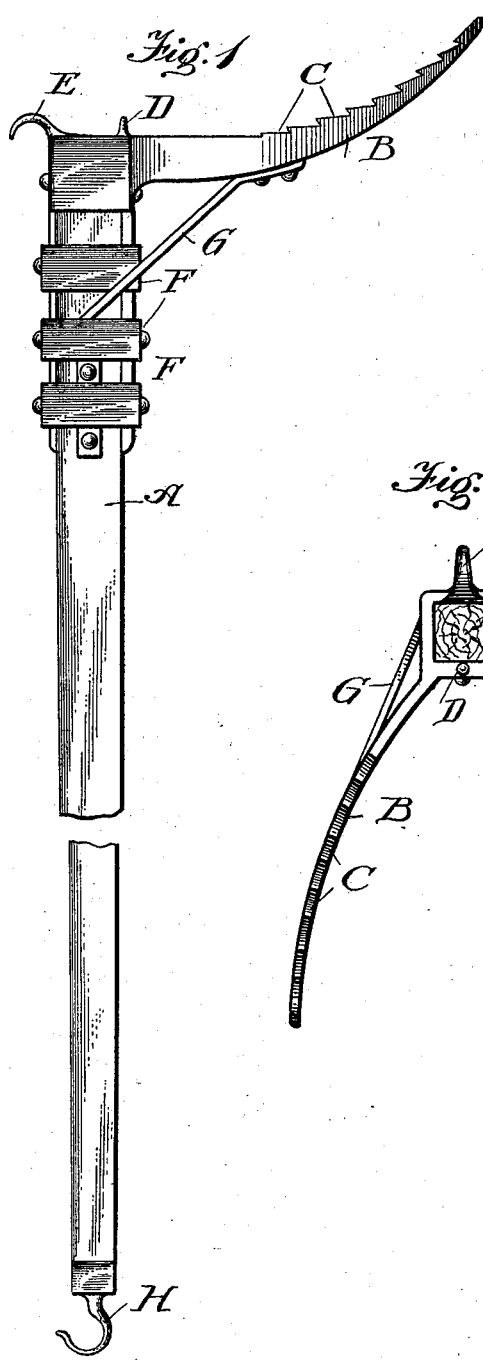
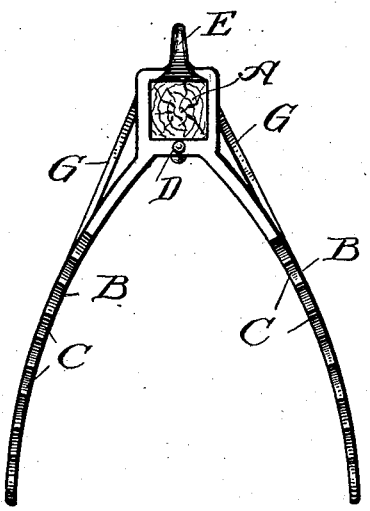
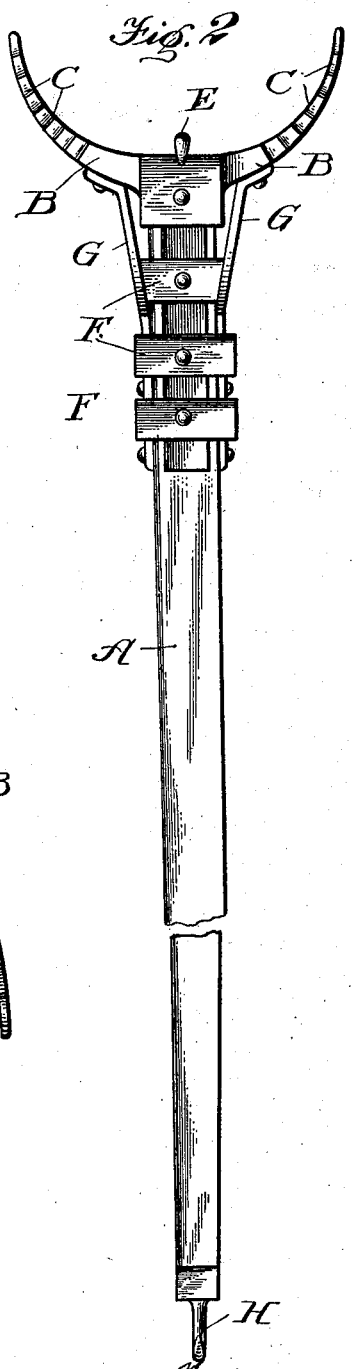
Witnesses:
Inventor

UNITED STATES PATENT OFFICE.

PIERRE BOUËRY, OF WEAVERVILLE, CALIFORNIA.

MACHINE FOR MOVING BOULDERS, &c.

SPECIFICATION forming part of Letters Patent No. 698,253, dated April 22, 1902.

Application filed February 4, 1901. Serial No. 45,805. (No model.)

*To all whom it may concern:*

Be it known that I, PIERRE BOUËRY, residing at the "La Grange Mine," Weaverville, in Trinity county, State of California, (whose post-office address is Weaverville, in said county and State,) have invented a new and useful Improvement in Machines or Appliances for Moving Rocks and Boulders and other Heavy Substances, which improvement and invention are fully set forth in the following specification and accompanying drawings, in which—

Figure 1 is a side view of the machine, implement, or appliance constituting my said improvement and invention. Fig. 2 is a top view of the same, and Fig. 3 is a front or forward end view of the arms or claws which are a part of the same.

The object of my said improvement and invention is to furnish a device by which to more easily, cheaply, and expeditiously move large rocks, boulders, and other heavy compact substances, and in that behalf and to that end more perfectly and completely apply the principles of leverage, and thereby obtain the greatest possible mechanical power in the simplest and least expensive form.

My device consists of a shaft or handle-bar A, having claws or arms B B firmly fixed and attached at right angles to its forward end and extending and curving downward and forward to their lower extremities and forking or diverging from each other from the point where they are joined to the handle-bar. The forward surface of the claws are provided with upturned ratchet-teeth C C, and at the point where they join the handle-bar is a spike extending an inch or two forward in a line with the handle-bar, which teeth and spike are intended to enable the device to obtain a firmer hold or grip upon the object to be moved and to prevent it from slipping. At the forward end of the device and on the upper side thereof is fixed a hook E, to which is to be attached the cable or rope from a stationary engine or from horses or other traction-power. A convenient length for the handle-bar is about eight (8) feet and of the claws about sixteen (16) or eighteen (18) inches; but the exact size or proportions of these parts are not essential elements of the device or machine.

The machine or device or implement is operated and used by the operator placing the forward surface of the claws or arms against the object to be moved on the side thereof opposite to the direction in which it is to be moved and with the lower ends of the claws or arms as far down and under such object as possible, and at the same time keeping the handle-bar in a substantially horizontal position, and then attaching the cable or rope and applying the traction-power, and the operator at the same time holding firmly the other or back end of the handle-bar and guiding the same and when required slightly depressing or laterally moving the same, so as to apply the leverage and shift the fulcrum to such point along the claws as the exigency of the operation may necessitate, and in this manner loosening or liberating and moving the boulder or other object.

In the drawings, A is the shaft or handle-bar.

B B are the arms or claws, which are made of sufficient strength to perform the service for which they are designed and may be two or more in number and are shaped like human fingers when the hand is open and the fingers spread far apart and slightly curved inwardly.

C C are the ratchet-teeth on the forward surfaces of the claws.

D is the spike at the forward end of the device.

E is the hook on the upper portion of the forward end of the machine to which is to be attached the traction apparatus.

F F F are bands or clamps by which the arms or claws are attached and bolted to the shaft or handle-bar.

G G are braces to add to the strength of the machine.

H is a hook at the rear end of the handle-bar for hanging up the machine when not in use; but it is not a necessary part of the machine.

Having thus described my invention, what I claim as new, and desire to secure by Letters Patent, is—

1. The combination of the shaft or handle-bar A and arms or claws B B with upturned ratchet-teeth C C C on their forward surfaces, and spike D, and hook E, all substantially as shown and described.

2. The form and combination of the shaft or handle-bar A and arms or claws B B with upturned ratchet-teeth C C C on their forward surfaces and spike D, and hook E, for the uses and purposes of moving rocks, boulders and other heavy compact substances, substantially as shown and described.

P. BOUËRY.

Witnesses:
 E. J. BENTON,
 D. H. EDWARDS.